US012770601B2

(12) United States Patent
Colciago et al.

(10) Patent No.: US 12,770,601 B2
(45) Date of Patent: Oct. 20, 2026

(54) METHOD FOR PRODUCING A SOUND ABSORBING PANEL

(71) Applicant: IMPACT ACOUSTIC AG, Lucerna (CH)

(72) Inventors: Isabella Colciago, Lucerna (CH); Massimo Gatelli, Lucerna (CH); Giovanni Ghilardi, Lucerna (CH); Paolo Milani, Lucerna (CH)

(73) Assignee: IMPACT ACOUSTIC AG, Lucerna (CH)

( * ) Notice: Subject to any disclaimer, the term of this patent is extended or adjusted under 35 U.S.C. 154(b) by 334 days.

(21) Appl. No.: 18/522,889

(22) Filed: Nov. 29, 2023

(65) Prior Publication Data

US 2024/0185823 A1 Jun. 6, 2024

(30) Foreign Application Priority Data

Dec. 1, 2022 (IT) ........................ 102022000024846

(51) Int. Cl.
*G10K 11/162* (2006.01)
*D21H 21/16* (2006.01)
*D21H 21/28* (2006.01)
*D21H 27/22* (2006.01)

(52) U.S. Cl.
CPC ........... *G10K 11/162* (2013.01); *D21H 21/16* (2013.01); *D21H 21/28* (2013.01); *D21H 27/22* (2013.01)

(58) Field of Classification Search
CPC ........ D21H 21/28; D21H 27/22; D21H 21/16; G10K 11/162
See application file for complete search history.

(56) References Cited

U.S. PATENT DOCUMENTS

| | | | | | |
|---|---|---|---|---|---|
| 4,377,440 | A * | 3/1983 | Gasland | C04B 28/02 162/146 |
| 2006/0036004 | A1* | 2/2006 | Wu | B27N 3/002 524/13 |
| 2020/0024844 | A1* | 1/2020 | Jacek | E04B 9/001 |
| 2020/0270861 | A1* | 8/2020 | Bartella | E04B 9/001 |
| 2021/0285207 | A1* | 9/2021 | Zuo | E04B 9/28 |

FOREIGN PATENT DOCUMENTS

| | | |
|---|---|---|
| EP | 0347810 A2 | 12/1989 |
| EP | 1300511 A2 | 4/2003 |

OTHER PUBLICATIONS

Italian Search Report dated Jun. 16, 2023 from counterpart Italian App No. 202200024846.

* cited by examiner

*Primary Examiner* — Forrest M Phillips
(74) *Attorney, Agent, or Firm* — SHUTTLEWORTH & INGERSOLL, PLC; Timothy J. Klima

(57) ABSTRACT

Method for producing a sound absorbing panel including the step of providing a predetermined amount of cellulose fibres. Cellulose fibres have an average length between 0.5 mm and 5 mm, preferably between 1.3 mm and 2.5 mm. The method further includes a step of soaking the cellulose fibres in a water basin to form a pulp and a step of depositing the pulp on a moulding die. The method further includes a step of pressing said the pulp in order to cause at least a partial removal of the water contained making a fibre mat. The method also includes a step of drying the fibre mat so as to cause evaporation of the water remained in the fibre mat making the sound absorbing panel.

11 Claims, 1 Drawing Sheet

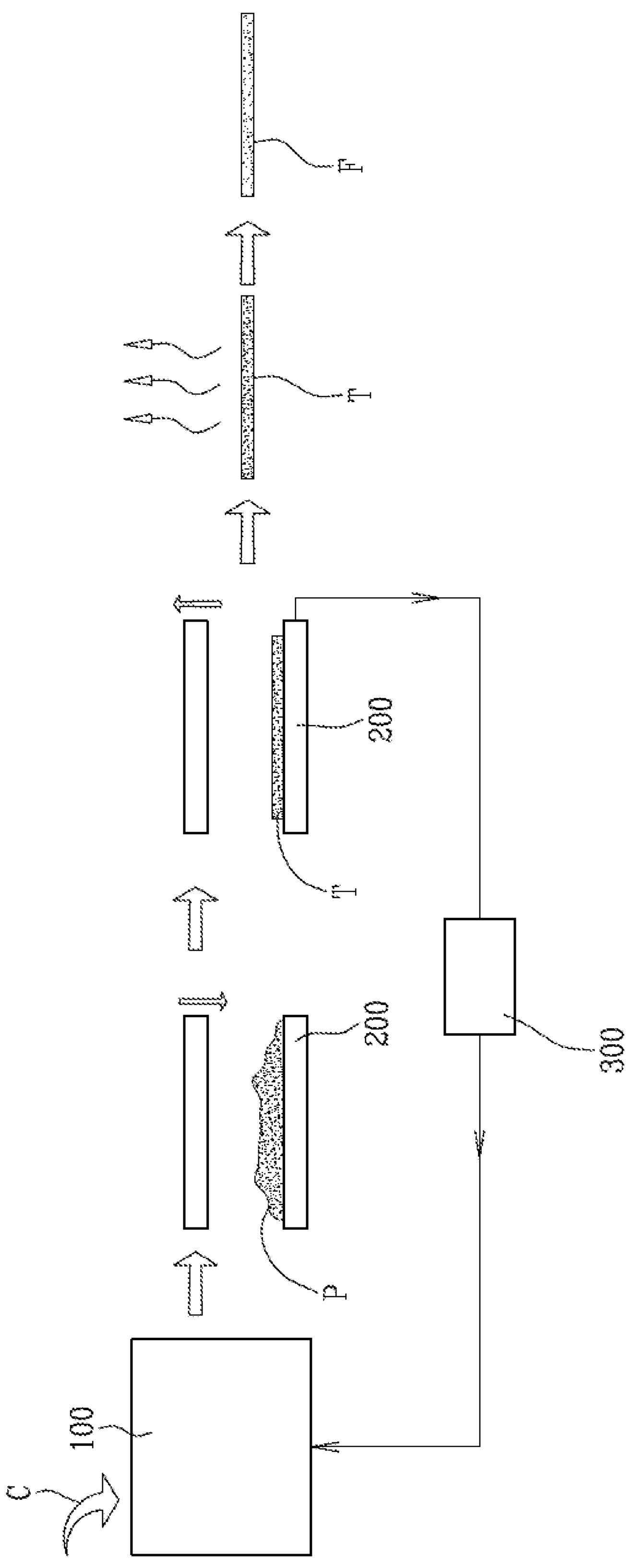
F
T
200
T
200
300
P
100
C

METHOD FOR PRODUCING A SOUND ABSORBING PANEL

This application claims priority to Italian Patent Application 102022000024846 filed Dec. 1, 2022, the entirety of which is incorporated by reference herein.

The present invention relates to a method for producing a sound absorbing panel.

The term “sound absorbing panel” refers to a cladding with the objective of making an acoustically insulated and/or more comfortable environment through the absorption of noise and the consequent reduction of reverberation. Specifically, a sound absorbing panel is a panel that can limit the propagation of sound waves in buildings and homes.

Sound absorbing panels are usually made of porous and/or fibrous materials of various kinds, including, for example, glass and rock wool, wood wool and cement, polyester and polymeric expanded foams of various kinds.

As a rule, sound absorbing panels made of synthetic materials are not environmentally friendly and do not present a particularly aesthetically pleasing appearance when installed visibly.

Acoustic panels can also be made from materials and fibres of plant or animal origin, including cellulose, a natural fibrous polymer. In such a situation, depending on the length of the fibres and the final density level of the material produced, the panel is more or less obvious.

However, as is well known, the use of cellulose fibres entails a problem of mechanical stability, strength and fragility of the sound absorbing panel.

To overcome this problem, it is known to use synthetic additives.

In particular, in order to give panels made of cellulose fibres better mechanical properties, it is known to process these fibres using processes typical of the paper and/or packaging industry. More specifically, a step (called refining) of pre-treatment in water of the cellulose fibres is required to produce the microfibrils necessary to guarantee a better mechanical seal of the panel produced.

In such a situation, the cellulose fibre panels produced have particularly low thicknesses, generally ranging from a few microns to a few millimetres. However, although these panels have better mechanical properties, their sound absorbing potential is poor.

In other words, these panels have good mechanical properties to the detriment of their sound absorbing properties.

Panels can also be made with cellulose fibres and lignin, another natural polymer originally contained in wood (to which it gives the typical brown colouring), which is known to confer better mechanical properties. However, also in this situation, the resulting panel has good mechanical properties but no sound absorbing properties.

Several methods and variations of these are also known for producing sound absorbing panels.

According to a first method, unrefined wood fibres, thus containing one part cellulose and one part lignin, are distributed in water to form a pulp that is then pressed at high pressure and high temperature.

This method makes it possible to produce panels in which the lignin itself is the binding agent of the wood fibres.

During the fibre distribution step, in order to give the panel a certain colouring, the method may also include a step in which a synthetic dye (usually a resin) is added.

Disadvantageously, in the whole process of making the panel, the water used is impossible to reuse as it contains residues of the glues used to bind the fibres and synthetic dye residues. In this situation, as the glues and dyes are usually toxic, it is not possible (or in any case highly costly) to purify and reuse the water for the formation of a new panel.

As an alternative to the distribution of unrefined wood fibres in water, it is possible to bond the dry fibres through the use of resins, which are pressed together with the unrefined wood fibres to create the panel.

Disadvantageously, the aforesaid method is highly energy-intensive.

According to a second method, cellulose fibres are heat-treated at high temperature. In more detail, fibre distribution takes place by means of a blowing operation during which the fibres are bound with a binder (e.g. a resin or glue) and then hot-pressed. Again, the binding process is conventionally carried out using glues or synthetic resins.

However, most commercially available resins that can be applied in the aforementioned dry process include a high content of formaldehydes, which cause both a major environmental and health problem due to the diseases that can result from inhaling these substances when the resulting panels are applied indoors.

In other words, it is now possible to make panels that have good mechanical properties but poor sound absorbing properties and vice versa.

The technical task of the present invention is therefore that of providing a method for producing a panel capable of overcoming the drawbacks emerging from the prior art.

The aim of the present invention is therefore to provide a method for producing a sound absorbing panel with good sound absorbing properties and, at the same time, good mechanical properties.

A further purpose of the present invention is to provide a method for producing a sound absorbing panel that is aesthetically pleasing to the eye.

A further purpose of the present invention is to provide a method for producing a more energy-efficient sound absorbing panel.

A further purpose of the present invention is therefore to provide a method for producing a sound absorbing panel that reduces the use of water.

A further purpose of the present invention is to provide a method for producing a sound absorbing panel that has a lower environmental impact and is therefore environmentally sustainable.

A further purpose of the present invention is to provide a method for producing a sound absorbing panel that is more easily implementable.

The specified technical task and the specified aims are substantially achieved by a method for producing a sound absorbing panel comprising the technical characteristics set forth in one or more of the appended claims. The dependent claims correspond to possible embodiments of the invention.

Further characteristics and advantages of the present invention will become clearer from the indicative and therefore non-limiting description of an embodiment of a method for producing a sound absorbing panel.

Such a description will be set forth herein below with reference to the accompanying drawing, provided for merely indicative and therefore non-limiting purposes, wherein:

FIG. 1 shows a diagram of the method according to the present invention.

The method for producing a sound absorbing panel “F”, according to the present invention, comprises a step of providing a predetermined amount of cellulose fibres.

According to an aspect of the invention, cellulose fibres have a length comprised between 0.5 mm and 5 mm.

Preferably, the average length of the cellulose fibres is comprised between 1.3 mm and 2.5 mm.

Advantageously, the length of the cellulose fibres used in the method according to the present invention makes the cellulose more easily processable.

Furthermore, the length of the cellulose fibres makes the sound absorbing panel "F" sufficiently rigid without the need to add binders and without the presence of lignin as is the case in the prior art.

Advantageously, the length of the cellulose fibres used in the method according to the present invention allows less water to be consumed in its processing, as will be described below.

Advantageously, the length of the cellulose fibres used in the method according to the present invention reduces the costs associated with the entire process because the cellulose is readily available.

The method further comprises a step of soaking the cellulose fibres in a water basin 100 to form a pulp "P".

In this situation, the cellulose fibres are dispersed in water to form the pulp "P".

According to a possible embodiment, the method comprises a step of adding at least one dye "C" to the water in order to give the pulp "P" a predetermined colouring.

In other words, if it is intended to give the final sound absorbing panel "F" a predetermined colouring, a dye "C" is added to the water basin 100 in which the cellulose fibres are soaked to form the pulp "P" so that the latter absorbs the dye "C".

Preferably, the dye used is a natural type of dye, e.g. a mineral dye.

Preferably, the dye "C" is a powder dye with a particle size, for example, comprised between 20 μm and 80 μm.

Preferably, the dye "C" consists of kaolin and at least one additional component.

For example, iron oxide and manganese oxide can be mixed with the kaolin to give the kaolin a Sienna, i.e. red, colouring.

By way of example, calcium, manganese and iron carbonates can be mixed with the kaolin to give the kaolin a black colouring.

Advantageously, the use of natural dyes enables the production of coloured and, at the same time, safe sound absorbing panels "F". In particular, natural dyes eliminate the problems resulting from possible harmful inhalation from formaldehyde-based resins used in the prior art.

In addition, the use of natural dyes lowers the environmental impact of the whole process of making the sound absorbing panels "F" as they are easy to dispose of and non-toxic.

The pulp "P" obtained from soaking the cellulose fibres in water is subsequently deposited on a moulding die 200.

Preferably, the moulding die 200 has a cross-section having the shape intended to be given to the final sound absorbing panel "F".

Following the distribution step, the method comprises a pressing step of the pulp "P" such as to cause at least partial removal of the water contained therein and to create a fibre mat "T".

In other words, during the pressing step, the pulp "P" is crushed and squeezed in such a way as to remove the water incorporated therein and in such a way as to give the pulp "P" the shape desired for the final sound absorbing panel "F".

By way of example, FIG. 1 shows a press in which the lower half-mould is the moulding die 200 and in which an upper half-mould is moved closer to the lower half-mould to press the pulp "P" and make the fibre mat "T".

According to a possible embodiment, the method comprises a step of collecting the water from the pressing step.

In more detail, during the pressing step, when the water contained in the pulp "P" is expelled, it is collected, e.g. in a receptacle 300. In this situation, the method comprises a step whereby the collected water is fed into the basin 100 for making a further sound absorbing panel "F".

In other words, the water from the pressing step is collected and used again as water for soaking the cellulose fibres to make a further sound absorbing panel "F".

Advantageously, through the collection and intake step, 90% of the water used for making a sound absorbing panel "F" can be recovered.

In the event that during the soaking step a dye "C" was added, the water resulting from the pressing step also contains therein part of the dye "C". In this situation, the method comprises, prior to the intake step, a step of purifying the water collected in order to remove the dye "C" contained therein.

Advantageously, the use of natural dye "C", and in particular powder dye, allows the water resulting from pressing to be re-used even if it had been coloured in the soaking step.

Moreover, even if the water was not reused, its disposal would be easy (through a simple decanting process) and not harmful to the environment as the dye "C" is natural.

Following the pressing step, the pulp "P" is "squeezed" to remove the water and deformed to form a fibre mat "T".

In this situation, the method includes a step of drying the fibre mat "T" in such a way as to cause evaporation of the water remaining in the fibre mat "T" itself by making the sound absorbing panel "F".

Preferably, the drying step takes place at a temperature comprised between 30° C. and 45° C.

Advantageously, drying the fibre mat "T" at such temperatures avoids the use of drying ovens and the like, significantly reducing the associated energy consumption.

At the end of the drying step, according to an embodiment of the method, the method comprises a step of applying an aqueous solution containing a waterproofing element to at least one surface of the sound absorbing panel "F".

Preferably, the waterproofing element is an acrylic product.

According to a possible embodiment, this waterproofing element is coloured.

The aqueous solution may also contain other elements that can guarantee particular technical performance to the panel "F", such as, for example, water-soluble fireproofing elements.

Advantageously, the application of the aqueous solution prevents the sound absorbing panel "F" from being damaged if placed in contact with water or moisture.

A sound absorbing panel "F" made in accordance with the method described above is also the subject matter of the present invention.

The sound absorbing panel "F" thus produced has a density value comprised between 100 $Kg/m^3$ and 700 $Kg/m^3$, preferably comprised between 150 $Kg/m^3$ and 350 $Kg/m^3$.

The resulting sound absorbing panel "F" has a sound absorbing value comprised between 0.4 and 1 aw.

Advantageously, the sound absorbing panel "F" made using the method described above is entirely recyclable as it does not contain any glues, solvents, resins or any other non-natural and toxic materials/substances.

In other words, the sound-absorbing panel "F" made by the method described above can, if for example damaged, be soaked again in water to form a new pulp "P" in order to repeat the steps of the method until a new sound absorbing panel "F" is formed.

The present invention achieves the intended purposes overcoming the drawbacks of the prior art.

The use of cellulose fibres with a length in accordance with the above allows the use of less water than known methods and facilitates the distribution of the pulp "P" on the moulding die 200.

Advantageously, the fact that no glues and/or synthetic dyes are used makes it possible to reuse the water resulting from the pressing of the pulp "P", reducing waste and the associated cost.

Furthermore, the fact that no adhesives and/or chemical dyes are used makes both the manufacturing process and the use of the sound absorbing panel "F" safe for health.

The method also reduces the energy consumption of the entire process for making the sound absorbing panel "F". In particular, drying the sound absorbing panel "F" at the claimed temperatures avoids the use of energy-intensive kilns and dryers.

The invention claimed is:

1. A method for producing a sound absorbing panel, the method comprising the steps of:

Providing a predetermined amount of cellulose fibers, said cellulose fibers having an average length comprised between 1.3 mm and 2.5 mm;

Soaking the cellulose fibers in a water basin to form a pulp;

Depositing said pulp on a molding die;

Pressing said pulp to cause at least a partial removal of the water contained in the pulp to make a fiber mat;

Drying said fiber mat to cause evaporation of the water remaining in the fiber mat to make said sound absorbing panel;

Said sound absorbing panel being produce without the addition of binders.

2. The method according to claim 1, comprising a step of adding at least one dye to the water basin to give a predetermined coloring to the pulp, said at least one dye being a natural dye.

3. The method according to claim 2, wherein said dye is a powder dye, the dye having a particle size comprised between 20 μm and 80 μm.

4. The method according to claim 1, further comprising the steps of:

collecting the water removed from the pulp during said pressing step;

introducing the collected water into said basin.

5. The method according to claim 4, wherein, before the introduction step, the method comprises a step of purifying said collected water to remove said at least one dye.

6. The method according to claim 1, wherein said drying step takes place at a temperature comprised between 30° C. and 45° C.

7. The method according to claim 1, comprising, subsequent to said drying step, a step of applying, on at least one surface of said sound absorbing panel, an aqueous solution comprising a waterproofing element.

8. A sound absorbing panel made in accordance with the method claimed in claim 1, presenting a density value comprised between 100 $Kg/m^3$ and 700 $Kg/m^3$.

9. The sound absorbing panel according to claim 8, presenting a sound absorbing value comprised between 0.4 and 1 aw.

10. The method according to claim 7, wherein said waterproofing element is an acrylic product.

11. The method according to claim 8, wherein said density value is comprised between 150 Kg/m3 and 350 Kg/m3.

* * * * *